(12) United States Patent
Hilderbrand et al.

(10) Patent No.: US 6,479,185 B1
(45) Date of Patent: Nov. 12, 2002

(54) EXTENDED LIFE BATTERY PACK WITH ACTIVE COOLING

(75) Inventors: H. Coleman Hilderbrand, Gainesville, FL (US); V. Evan House, Gainesville, FL (US); Martin C. Orler, Gainesville, FL (US)

(73) Assignee: Moltech Power Systems, Inc., Gainesville, FL (US)

( * ) Notice: Subject to any disclaimer, the term of this patent is extended or adjusted under 35 U.S.C. 154(b) by 0 days.

(21) Appl. No.: 09/542,225

(22) Filed: Apr. 4, 2000

(51) Int. Cl.[7] .............................................. H01M 10/50
(52) U.S. Cl. ......................................... 429/148; 429/62
(58) Field of Search ................................ 429/148, 153, 429/154, 158, 163, 176, 62

(56) References Cited

U.S. PATENT DOCUMENTS

| | | | |
|---|---|---|---|
| 4,107,402 A | * 8/1978 | Dougherty et al. | 429/120 |
| 5,569,552 A | * 10/1996 | Rao et al. | 429/72 |
| 5,620,057 A | 4/1997 | Klemen et al. | |
| 5,866,276 A | * 2/1999 | Ogami et al. | 429/120 |
| 5,879,831 A | 3/1999 | Ovshinsky et al. | |
| 5,985,483 A | * 11/1999 | Verhoog et al. | 429/120 |
| 6,228,524 B1 | * 5/2001 | Kohler et al. | 429/62 |

FOREIGN PATENT DOCUMENTS

| | | |
|---|---|---|
| JP | 10-270094 | 10/1998 |
| JP | 2880200 | 4/1999 |

* cited by examiner

Primary Examiner—Gabrielle Brouillette
Assistant Examiner—M. Wills
(74) Attorney, Agent, or Firm—Sven W Hanson

(57) ABSTRACT

The present invention provides a module for retaining and cooling a group of primary or secondary electrochemical cells for use in powered devices. To provide more effective cooling and reduce thermal gradients, cells are aligned in a side-by-side configuration within a multi-pass cooling passage. The multi-pass cooling in each module results in potentially longer useful life for the entire array. Large array batteries are formed of multiple modules, the shape and configuration of the modules allowing a variety of compact combinations having high energy density. In one configuration of an array battery according to the invention, two decks of modules are stacked vertically within a rigid enclosure. Air as a cooling medium is induced through each module to reduce cell temperatures. Temperature monitoring of each cell in a module and array allow for maintenance and identification of thermal events effecting continued long term operation. Temperature monitoring is carried out preferably using PTC (Positive Temperature Coefficient) devices which are held against the cell sides.

18 Claims, 14 Drawing Sheets

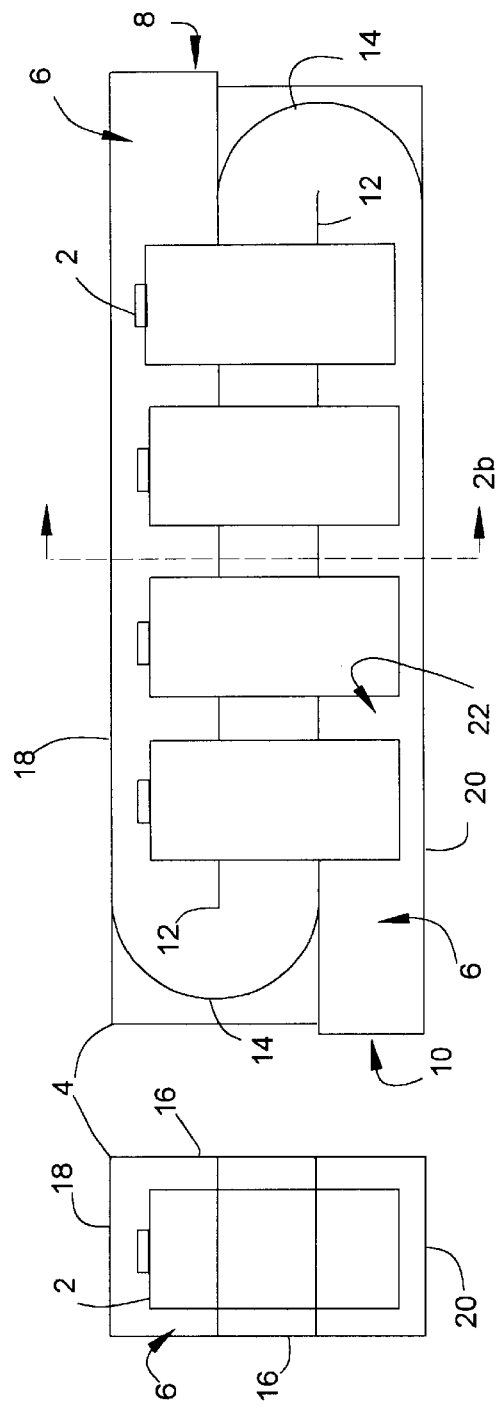
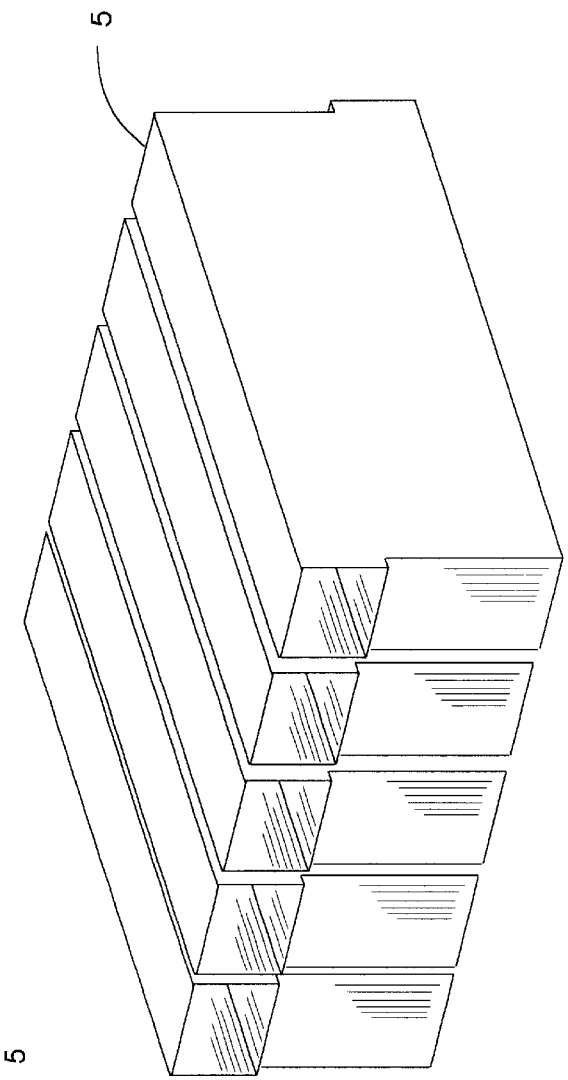
Fig. 2a
Fig. 2b
Fig. 2c

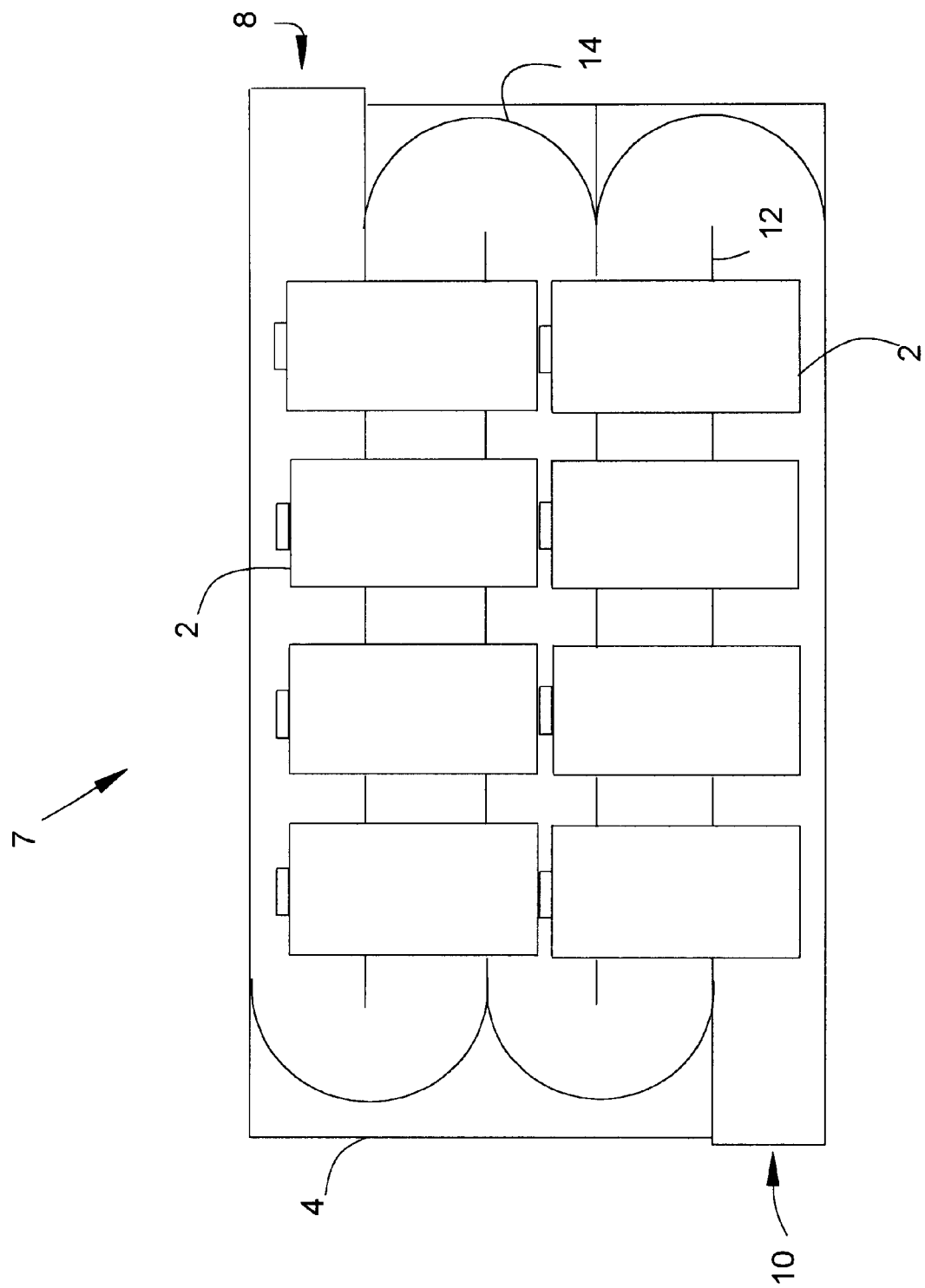

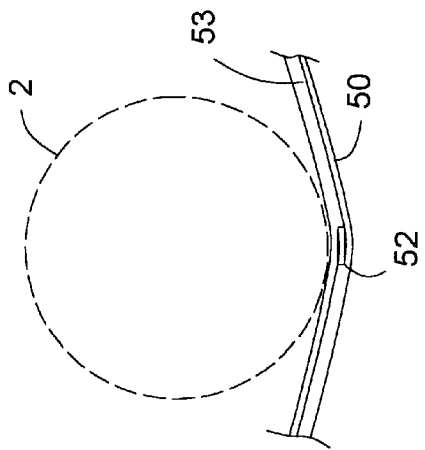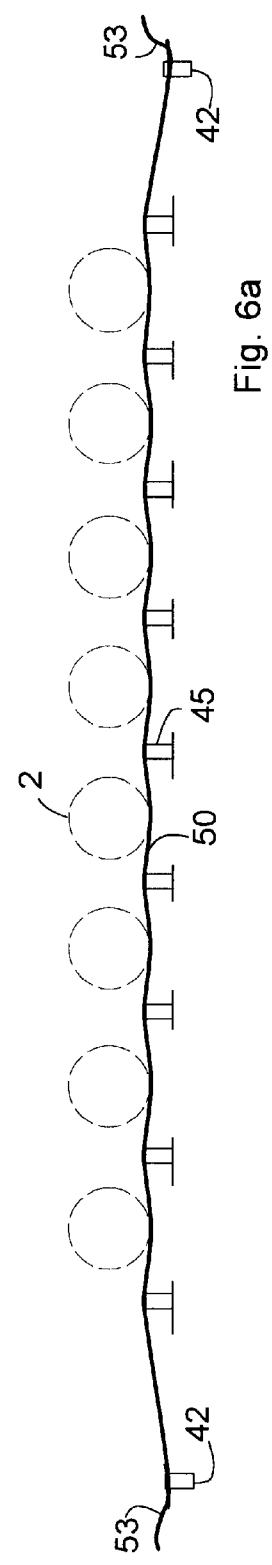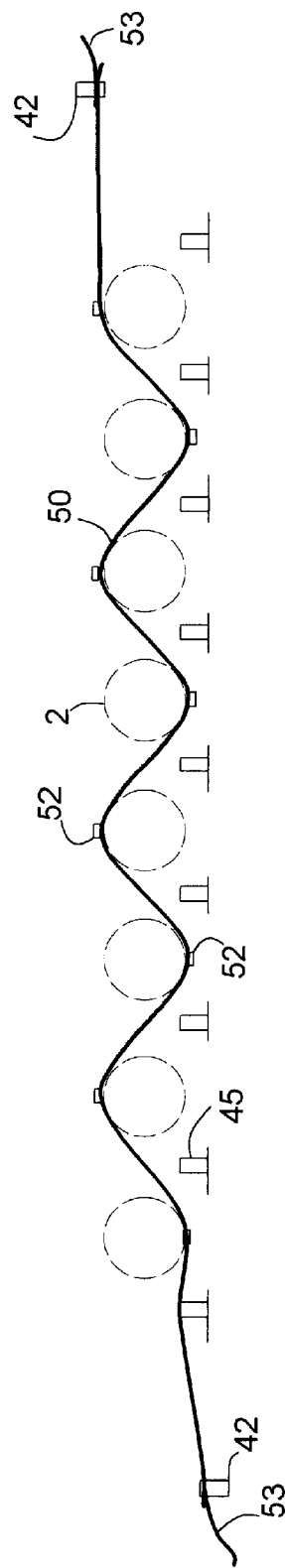

EXTENDED LIFE BATTERY PACK WITH ACTIVE COOLING

BACKGROUND OF THE INVENTION

The present invention pertains to applications of large battery arrays. Particularly, the invention relates to extended-life battery arrays used in electrically powered vehicles.

In the recent drive to design and produce large electrically powered devices such as electric vehicles for human transportation, a major technical challenge has been the efficient storage of electrical energy. The primary devices for electrical energy storage are primary and secondary electrochemical cells. Past electrochemical cell designs have focused on units having relatively small capacity to be used singly or in small arrays to power devices with relatively small energy requirements. These have been devices using electrical energy for primarily non-motive purposes such as lighting, sound production and signal generation. Until recently, small electrochemical cells have been effective for these purposes. Large motive devices, such as personal automobiles, with large power and energy requirements have introduced significant new design requirements. These include high voltages and drain rates, large total capacity, long life, and high energy density. One consequence of the high drain rates and large size of automotive battery arrays is the generation of large amounts of heat that must be removed from the system. This heat is a result of internal resistive heating in each electrochemical cell. Without means of cooling the cells, the cell temperature can quickly rise to a point that the cell performance is damaged. Depending upon the type of cell, such elevated temperatures may be reached that physical destruction of the cell occurs. Controlling the temperature extremes experienced by cells during operation is necessary to ensure a maximum life is achieved before the cells' reduced performance requires their replacement. In large arrays of multiple cells it is necessary to control the temperature history of all cells uniformly. Deterioration of a single cell in a cell array, through elevated temperature degradation, can result in significant performance reduction for the entire array. The degrading effect of elevated temperatures on secondary cells is well known in the industry. The temperatures at which degradation becomes significant depends in part on the particular construction of the cell, such as, for example, the material of the separators used between the cell electrodes. For example, in some nickel metal-hydride cells, degradation increases with rising temperature until at about 50 degrees Celsius (° C.) the useful life of the cell is significancy reduced. However, in a large array without active cooling, these cells have been found to quickly reach temperatures of 50 to 70° C. during operation. In applications such as personal automobiles, the useful lifetime of cell arrays before replacement is desired to be at least 8 to 10 years due to costs and user expectations. This can only be achieved with uniform cooling.

In prior electrical energy storage devices for automotive uses, large combinations, for example a hundred or more, of small secondary cells have been used to provide the necessary power and energy. The selection of small cells is in part to take advantage of existing available cell production to avoid the cost of custom cell fabrication. However, the desire to minimize the impact on usable space in personal vehicles has motivated increased density arrays. Typically, cylindrical cells (having terminals at the ends) are aligned in a number of parallel "sticks" or end-to-end columns of cells. As well as reducing inactive space, the end-to-end configuration improves spatial density in part by reducing the cell-to-cell electrical interconnection structure. A potential problem with the end-to-end configuration is that significant displacements at the ends of the cell sticks may result from the cumulative thermal expansion in the cells. This thermal displacement, which is the sum of the expansions in the individual cells, must be accommodated by the design of the supporting structure and is a potential source of problems. Even at the highest achievable spatial densities, existing storage devices for automobiles require significant space. Due to their size and power output, such arrays generally require active cooling of some form. One method is to provide a cooling air stream directed through the array and between the sticks of cells.

It is most desirable that a designed cell array be usable in more than one application. Because it is anticipated that personal vehicle designs will continue to show the variability found in the past, cell arrays will be required to fit in various sized and shaped spaces, as well as having various performance requirements. A single fixed cell array configuration is not practical for such a use. An array design that is adaptable to various form factors and performance demands is more desirable. At the same time, cost is always a factor in consumer products, motivating simplicity as well as ease of assembly and repair and replacement.

What is needed is a simplified energy storage device using a cell array design which maximizes cooling efficiency and temperature uniformity to ensure an extended life. At the same time the array design should be easily adaptable to different forms and performance requirements.

SUMMARY OF THE INVENTION

The present invention provides an electrochemical cell module including a module housing combinable in various ways and numbers to create different cell arrays. The module housing uses a multi-pass cooling passage that cools cells more efficiently and reduces thermal gradients to increase array life regardless of the number of modules combined in an array.

An object of the present invention is an electrochemical cell module in which cells are retained in a linear side-to-side configuration within a multi-pass cooling passage for effective cooling of the cells and reduced thermal gradients.

A second object of the present invention is an extended life power supply including multiple cell modules each having a reduced temperature gradient.

A further object of the invention is a vehicle powered by an array of electrochemical cells which are cooled in a manner to reduce temperature gradients to provide an extended operational life.

A further object of the invention is a method of ensuring uniform cooling throughout a large array of electrochemical cells by enclosing groups of the cells in side-by-side configurations in individual housings, bundling the housings into a high density configuration and directing a stream of cooling medium through each housing.

A yet further object is an extended life, large, high density array using sub-C configuration cells.

In order to ensure even and uniform cooling of large arrays of primary or secondary cells, the cells are divided into small groups, each group housed and cooled separately. The cells are arranged in side-by-side orientation within module housings. The housings are preferably generally prismatic in shape to ensure compact reassembly into a variety of different configurations. Each housing has a cooling passage extending from a housing inlet to a housing outlet and configured to direct, during use, a cooling medium over the cells. The cooling passage is divided to force the cooling medium in a multi-pass configuration over the cells. The multi-pass passage increases cooling efficiency and reduces thermal gradients throughout the cells. In one preferred configuration, a three-pass passage provides an optimum performance. Because cell operational life is temperature dependent, temperature monitoring devices may be provided on each cell. These can be monitored to detect aberrant conditions which result in elevated temperatures in any one cell.

In a preferred module housing, separated portions of the cooling passage are used to direct cooling medium at the ends of the cells. Conductors are resistance welded to the ends of the cells to provide interconnection. Each housing has a window opening in the top and bottom of the housing to provide access to the cell ends for welding of the conductors. During operation, these conductors act at various times as heaters and heat sinks of the cells. In the preferred embodiment, the conductors reside in the separated portion of the passage to ensure effective cooling. In an alternative embodiment, the passage has a continuously decreasing cross-sectional area resulting in increasing flow velocity along the passage. The increased flow velocity enhances heat transfer to balance the reduced cooling effect resulting from the rise in temperature of the cooling medium.

Large arrays of cells are formed by combining multiple cell modules with their respective inlets and outlets aligned. Various array enclosure plates include raised portions which are sized and arranged to act as inserts fitting sealingly within the window openings of the module housings. The housings are captured between the enclosure plates with the spacing of the inserts fixing the relative position of the housings. The modules are electrically interconnected to provide the output required of the array. Large arrays may consist of one or more vertically stacked decks of modules. In a multi-deck array each deck is joined to the vertically adjacent deck by an enclosure plate having raised inserts on two opposing faces.

The present invention provides novel methods of effectively cooling large arrays of cells to extend their useful operating life. These methods and devices are particularly advantageous to form novel extended-life powered devices such as vehicles. One array, according to the present invention, incorporates sub-C (Cs) configuration cells to form arrays having optimum characteristics for hybrid-electric vehicles, as well as other devices.

Additional advantages of this novel invention as described in the following drawings, detailed description, and claims will be apparent to one skilled in the art.

DESCRIPTION OF THE DRAWINGS

FIGS. 2a and b are two views of one embodiment of the invention in which a single linear array of cells is cooled in a multi-pass module. FIG. 2c depicts several such modules combined to form a large array of modules.

FIG. 3 depicts an alternative cell module configuration in which a multi-pass cooling passage is used in conjunction with sets of cell pairs aligned end-to-end.

FIG. 4a depicts a half-housing without cells.

FIGS. 6a, b, and c depict configurations of temperature sensing devices retained proximate the individual cells in the module configuration of FIGS. 4a, b, and c.

DESCRIPTION OF THE PREFERRED EMBODIMENTS

Figure 1:
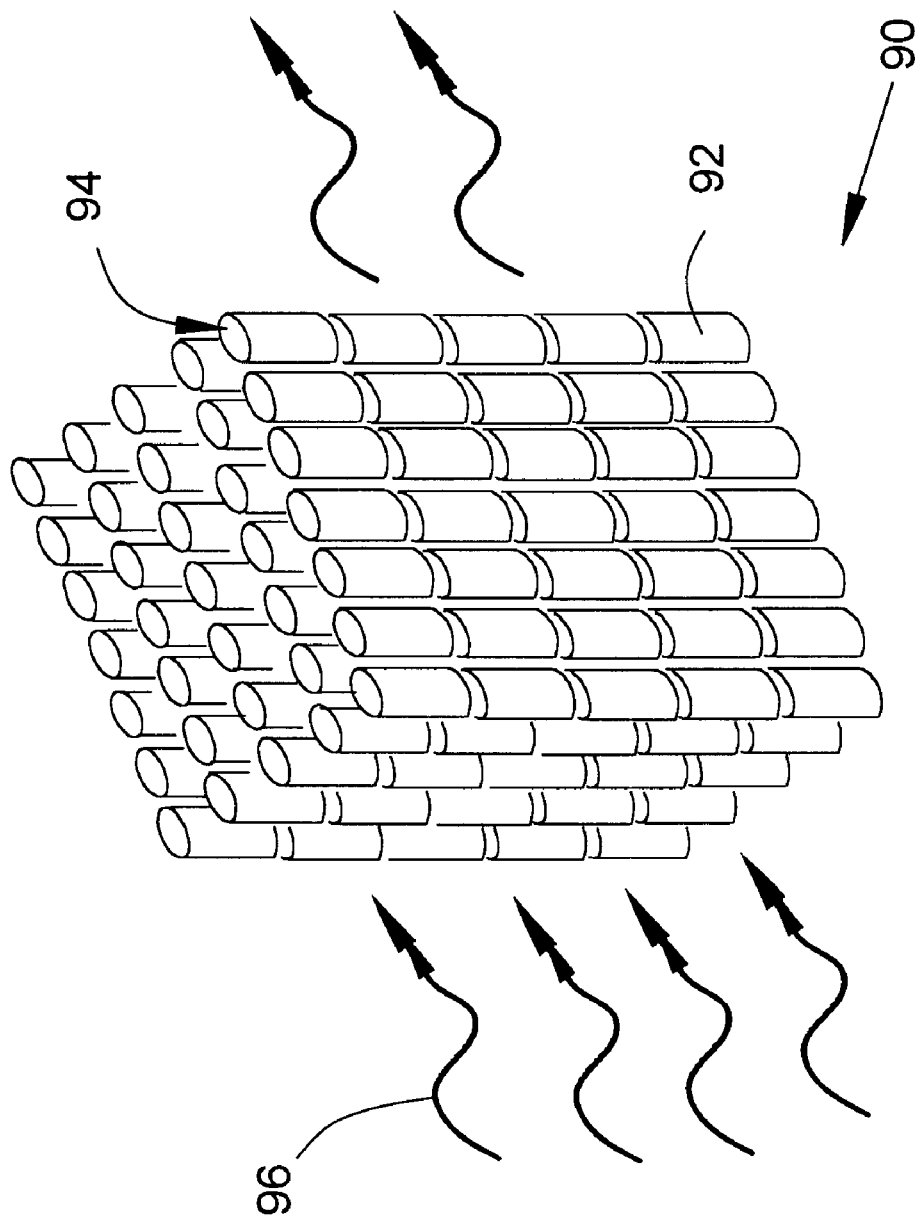
FIG. 1 depicts multiple sticks of electrochemical cells combined into a power supply in the prior art.

FIG. 1 depicts an electrochemical cell array similar to those found in the prior art. An example of this type of device is disclosed in Japan Patent No. HEI 10-27009 (Laid-Open; Oct. 9, 1998). In FIG. 1, a three dimensional array 90 is formed by first stacking individual cells 92 end-to-end to form "sticks" 94. Multiple sticks are oriented spaced apart to form the array. The stick configuration of cells is advantageous in minimizing space. Such large arrays require active cooling to dissipate the internally generated heat. As shown, an air flow 96 is forced in a single pass around and between the sticks 94 to absorb and carry away the heat generated in the cells. Due to the rising temperature of the air as it passes through the array, the cells at the end of the pass experience a reduced cooling effect. The result is a temperature gradient through the array with the cells near the air flow exit being the hottest. Because the life of the array is limited by the life of the first cell to fail, it is preferred that all cells age or deteriorate at the same rate; and because elevated temperatures are a cause of detrimental deterioration in cells, it is necessary that temperature gradients in the array be minimized. An unmodified single-pass array such as shown in FIG. 1 will have a temperature gradient potentially resulting in uneven aging of the cells. Various methods have been used in the prior art to shield the individual sticks by varying degrees through the array to balance the reduced cooling effect of the air flow and reduce this gradient. One configuration of shields is depicted and discussed in the document referenced above. The result is an overly complex structure.

FIGS. 2a and b depict one embodiment of the present invention in which a linear array of cells 2 are retained in a generally prismatic housing 4 to form a multi-cell module 5. The term "cell", as used herein, refers to both single cell units as well as similarly packaged batteries of cells. Cell refers equally to both primary and secondary single cell units and batteries. The device in FIGS. 2a and b has a multi-pass design. The term "multi-pass", as used herein, indicates that the air stream is passed through the entire array of cells two or more times in succession. In FIG. 2a one side of the housing 4 has been removed to expose the internal structures. Unlike the prior art previously discussed, in the present invention the cells 2 are not aligned end-to-end but rather singly in side-to-side fashion. Cumulative thermal expansion problems are thereby avoided, and thermal expansion of individual cells is easily accommodated by the fit of the housing 4. A side-by-side configuration, as used herein, means that all cells are aligned mutually parallel and with both cell ends free, without end-to-end stacking as shown in FIG. 1. The most preferable side-to-side configuration is depicted in FIG. 2a (and FIG. 4b) where all cells have colinear transverse axes. The housing 4 contains a three-pass passage 6 connecting a housing inlet 8 and outlet 10. The passage 6 is formed by thin-walled dividers 12 and reversing ducts 14 which extend between the sides 16 of the housing 4. The two dividers 12 are equally spaced between the housing top 18 and bottom 20 and form the boundaries separating the individual passes. One divider terminates at one end of the housing to form the inlet 8. The second divider similarly forms the outlet 10 at the other end of the housing. The dividers 12 have aligned through-holes which receive and retain the cells 2, a portion of each cell 2 extends into each of the three passes of the passage 6. This defines "three-pass" as each cell contacts the air flow at three distinct points along a continuous flow path through the passage, the air flow passing over the entire complement of cells in the module three times in succession. Although many of the benefits of the examples herein may be obtained with multi-pass configurations having more or less than three passes, a three-pass configuration has been found optimum in many configurations. For example, a two or four pass configuration results in the inlet and outlet on the same side of the module housing, which is more complex for connecting air supplies. A five or more pass configuration has an increased pressure drop across the module, all other parameters being equal. However, for high aspect ratio (length to diameter) cells, or modules with two or more end-to-end stacked cells, a five-pass configuration may be desirable to reduce inter-cell or intra-cell thermal gradients. Pressure drop difficulties may be addressed by reducing the cooling medium velocity. A five-pass module 7 incorporating two end-to-end stacked cells in place of each of the single cells of FIG. 2 is shown in FIG. 3. Although the end-to-end stacked cells are not a preferred configuration, they will gain similar benefits from a multi-pass module.

In operation, the air pressure at the inlet 8 is maintained above that at the outlet 10 to produce air flow through the housing 4. The air is supplied from a source having a temperature lower than the target temperature of the cells. As the air flows around and over the cells, heat is transferred from the hotter cells to the air, thereby cooling the cells. The multi-pass configuration distributes the cooling effect of the air more evenly through the cell array than single pass systems. The cooling load for a particular module is dependent upon the configuration and operational characteristics of the cells used. In general, the cooling capacity of an air stream is a function of air temperature, density and moisture content. The total cooling effect obtained is also dependent upon the air velocity of the air passing over the cells. The pressure differential between the inlet and outlet to produce the required air velocity is dependent upon the internal geometry of the housing. All of these factors may be analytically or experimentally determined for a particular design, and methods for making these determinations are well known. The inlet and outlet configurations depicted in the figures were selected for convenience and simplicity. Other, less desirable, configurations and locations for housing apertures to allow entrance and exhaust of the cooling medium to and from the passage are also contemplated.

The cells preferably used in the present invention have metallic containers. Such cell containers have inherently high thermal conductivity resulting in high transverse heat conduction over the cell surface. Consequently, it is not essential to provide uniform air flow over the entire surface of each cell. In the gap 22 between adjacent cells the air velocity is reduced and reduced cooling effect would be expected. However, heat from these regions of the cells is conducted to those portions of the cells exposed to higher velocity air and greater cooling. The high conductivity of the cell containers potentially reduces higher temperature areas and effectively "averages" the cooling effects over the cell surface. For this reason also the cell-to-cell spacing is less critical. Because the air stream temperature rises along the passage, and therefore the portions of each cell in each of the three passes see varying cooling effect, there is a potential for a temperature gradient over the length of individual cells. This would be detrimental to the longevity of the cells. However, due to the high lateral conductivity of cells with metal containers, this gradient has been found to be minimal and not deleterious. An alternative housing structure which will reduce the intra-cell gradient, as well as reducing cell-to-cell gradient, is a passage having a gradually decreasing cross-sectional area. This is achieved in an alternative embodiment by angling the dividers to form a continuously tapered passage from the inlet to the outlet. The result is to cause the air flow velocity to increase continuously as it passes over the cells. The decreased cooling effect resulting from the increased air temperature is compensated by this increased air velocity. By maintaining the overall cooling effect of the air stream, the cells are cooled evenly at each point and minimal temperature gradient is produced over the length of each cell. The increase in air velocity (and so the angle of dividers) required in the passage in a particular design will be dependent upon the particular cell characteristics and operational cycle. Although in the examples shown only four cells are depicted for simplicity, each module may include a larger number of cells to increase spatial packing.

The housing 4 of the examples above may be fabricated of any of a variety of materials including metals and plastics. For cost and simplicity, the housing is preferably a molded high density polymer. The housing may be formed of two symmetric halves with a parting line passing through the middle of the top, bottom, ends and dividers. Such constructions are well known to those skilled in the art.

For discharging and charging of the cells, electrical connection must be made to the cell positive terminal and negative terminal. In the above configuration, this may be by conductive straps resistance welded to the cells 2 and exiting the housing 4 through a housing aperture (not shown). These particulars are not critical except as they may effect the flow of the cooling medium. This issue is addressed in the examples below. Two or more modules 5 may be combined to form a large array of cells as shown in FIG. 2c, the module-to-module electrical connections being combined in series and parallel circuits as necessary to produce the desired output. The flat-sided prismatic construction of the module housing and the orientation of the inlet and outlet on the housings also allow multiple modules to be aligned side-to-side. In such configurations, common inlet and common outlet air plenums may be used to control the air flow to all modules. Similarly, multiple modules may be stacked top to bottom. Examples of these configurations are discussed in more detail below with respect to the following embodiments.

Figure 4A:
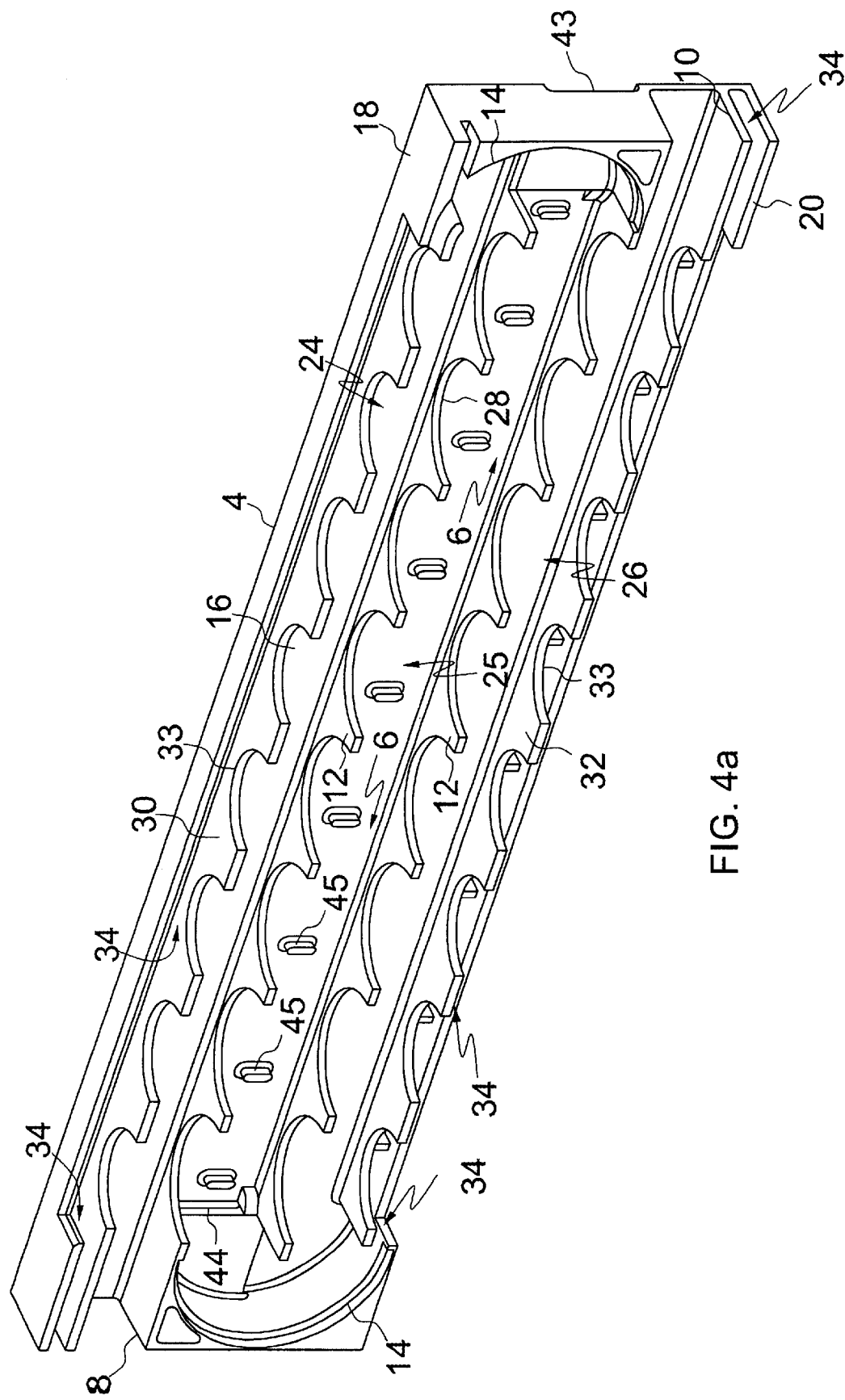
FIGS. 4a, b, and c are isometric views of a preferred embodiment of the invention.
Figure 4B:
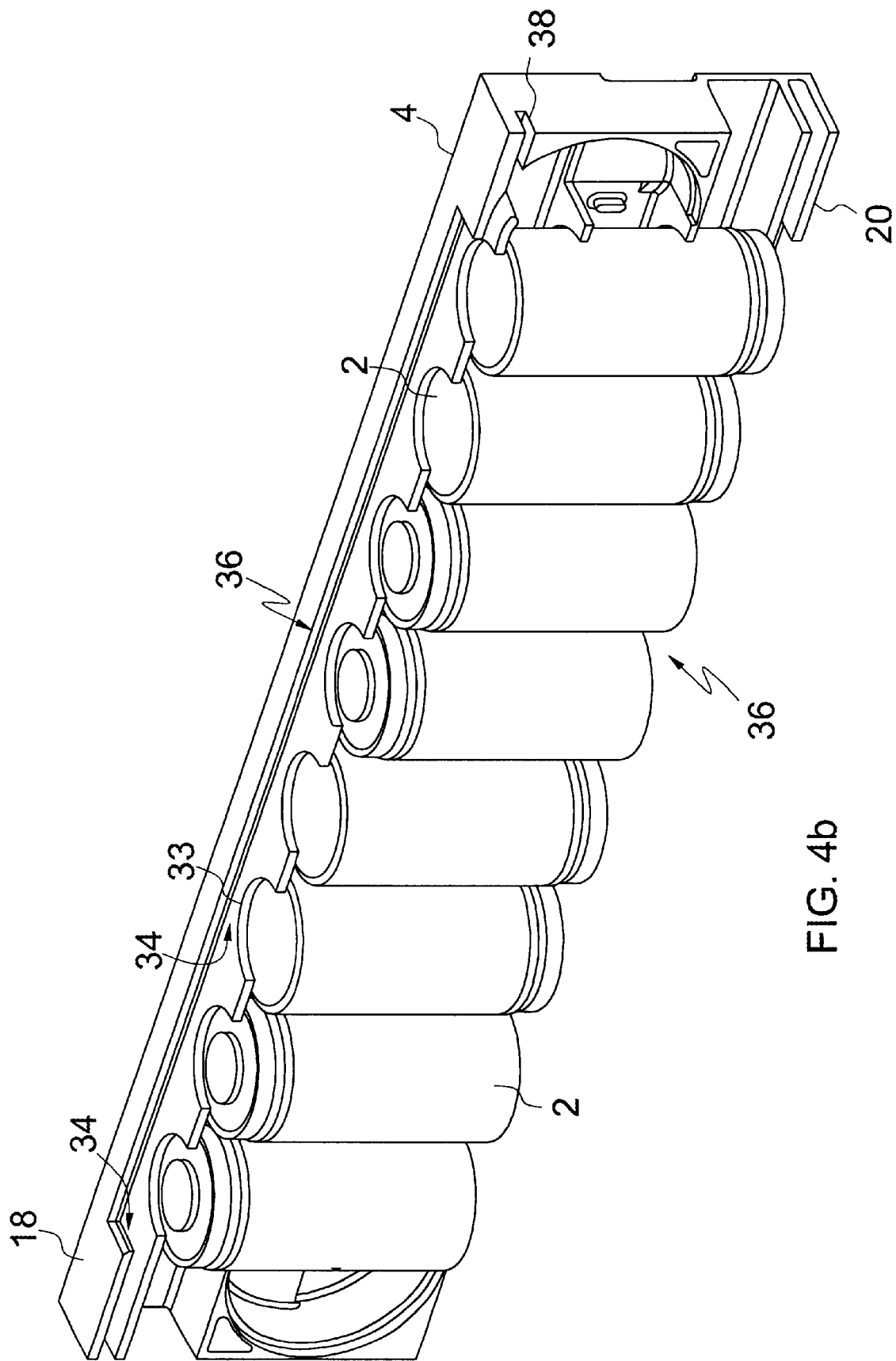
FIG. 4b depicts a half-housing with a full linear array of cells in place.

FIGS. 4a, b, and c depict a preferred embodiment of the invention. A module housing 4 is split in two symmetric halves along a parting line one half being shown in FIGS. 4a and b. Between the housing sides 16 two dividers 12 extend substantially the length of the housing 4 dividing it into an upper pass 24, middle pass 25, and bottom pass 26. The middle pass 25 is connected at one end by a reversing duct 14 to the upper pass 24 and similarly at the other end to the bottom pass 26. The interconnected passes form a continuous three-pass passage 6 from an inlet 8 at one end of the housing to an outlet 10 at the opposite end. The dividers 12 of each half-housing each have semicircular cutouts 28 sized to receive a selected cell. The cutouts 28 of the two dividers 12 are aligned to form cradles to receive the cells. The bottom of the cutouts 28 are spaced from the housing sides 16 so that when cells are placed in the cutouts 28, a clear path for air flow remains between the cells 2 and the housing sides 16. The tops of the dividers 12 extend to the housing parting line such that when the housing halves are joined, the dividers of each half meet to form continuous boundaries between the respective passes. Within the upper pass 24, and offset from the housing top 18, is a top partition 30 which extends from the face of the inlet 8 to just short of the reversing duct 14 at the opposite end of the housing. A bottom partition 32 is similarly configured in the bottom pass 26. The top and bottom partitions are spaced from each other approximately the length of a cell. Each partition has circular reduced cutouts 33 aligned coaxially with the divider cutouts 28. When cells are placed in the cradles, they are captured between the partitions 30, 32 with the cell ends exposed through the reduced cutouts 33, as shown in FIG. 4b. The space between the top partition 30 and the housing top 18 form a separated passage 34 within the top pass 24. Similarly, the bottom partition 32 and the housing bottom 20 form a separated passage 34 within the bottom pass 26. Because the leading edge of the top partition 30 splits the plane of the inlet 8, a separated portion of the incoming air flow is directed into the separated passage 34 during operation. Similarly, the leading edge of the bottom partition 32 faces the air flow in the lower reversing duct 14, thereby directing a portion of the air flow into the bottom separated passage 34. A benefit of this separated air flow is ensured cooling of the cell-to-cell interconnect conductors to reduce electrical resistance. Due to the high current flowing through these conductors during operation, they can be heated to elevated temperatures which in turn increases their internal resistance. By ensuring that these conductors are cooled by a portion of the air flow entering the housing, total resistance is lowered as well as resistance losses reduced. At high drain rates, the resistance heating of these conductors can exceed the heat generated by the cells themselves. The temperature of the conductors may be higher than the cell temperatures, resulting in cell heating by conduction from the conductors. Effective cooling of the conductors by use of a separated passage and separated flow minimizes this risk. At low drain rates, the conductors can have the opposite effect, acting as heat sinks to draw heat from the cells. Again, at these times effective cooling of the conductors assists in lowering cell temperatures.

Figure 4C:
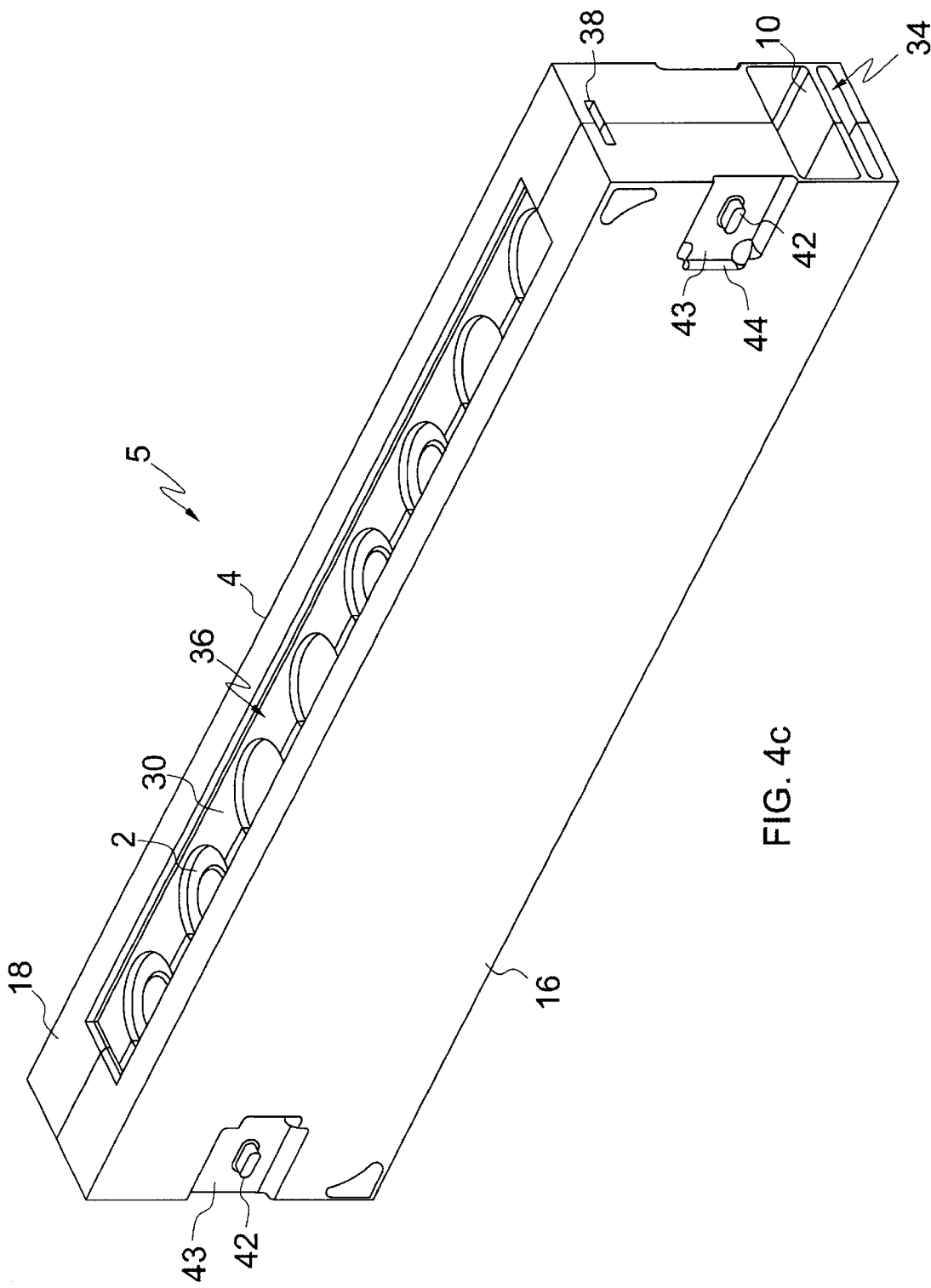
FIG. 4c depicts the assembled module including cells but without electrical connections.
Figure 5:
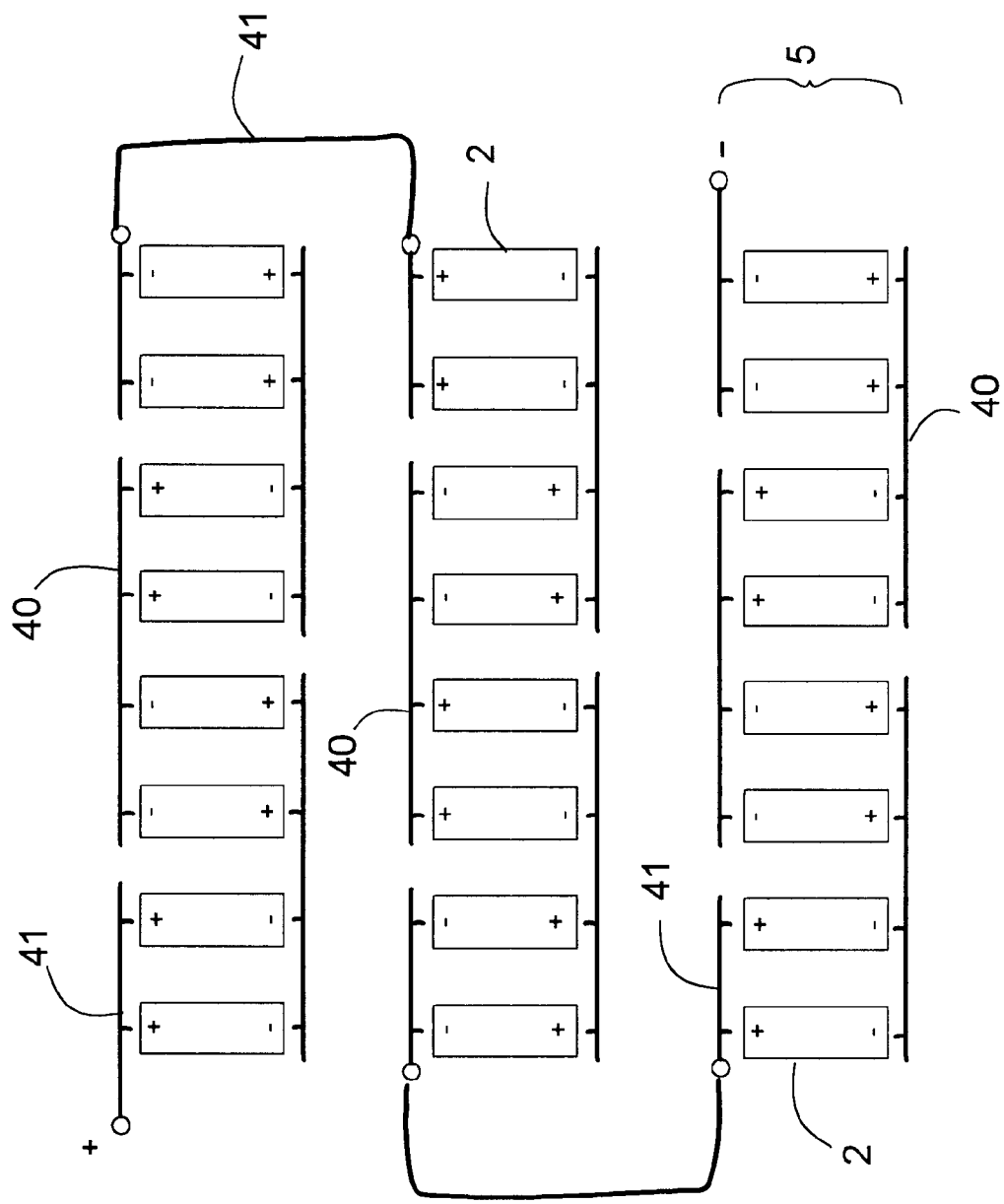
FIG. 5 is an electrical schematic diagram of the cell and module interconnections for the embodiment of FIGS. 4a, b, and c.

The housing top 18 and bottom 20 each includes a window 36 through which the end of each cell 2 is accessible after assembly. The function of the window 36 is to provide sufficient access to the cells to complete electrical connections during assembly. After inserting the cells into a module housing, connection must be made to each cell for charging and discharging. Preferably, this is accomplished by resistance welding a woven conductive strap (not shown) to the cell terminals as necessary to complete the series and parallel circuits required. A section of woven strap is inserted through the housing window 36 into the housing and over the ends of the cells to be interconnected. Resistance welding electrodes, passing through the window 36, push the strap through the reduced cutout 33 to contact the cell positive terminal (typically the cell top) or the cell bottom (typically the negative terminal) and complete the welded connection. The strap is substantially retained within the separated passage 34 of the housing. Resistance welding of connections to cell terminals is well known to those skilled in the art. A braided strap conductor is preferred for its flexibility which simplifies the method of connection, however, other conductor elements may also be used. One external connection to the cells is made by extending a connected terminal section of conductive strap through an end aperture 38 at the one end of the housing. An opposite pole terminal section of strap exits the housing through the end of the separated passage 34 at the opposite housing end. The two terminal straps are then available for connecting the cell module to an external circuit. Multiple modules may be connected by joining their respective terminal straps. FIGS. 4b and c depict a module with eight cells arranged in sets of two for parallel connection. The strap arrangement for three such interconnected modules is shown schematically in FIG. 5 where lengths of inter-cell conductors 40 connect the cells 2 of each module 5 while inter-module conductors 41 connect the modules. FIG. 4c shows an assembled module 5 including both housing halves joined. Conductors have not yet been welded to the cells 2. After each individual module is fully assembled, the housing window 36 of each module in an array is closed by placement of an array cover which is discussed below with respect to FIG. 8. The construction of the housing window 36 and the manner of retaining the cells 2 allows the cells to be interconnected in a variety of combinations. By altering the choice of cells welded to each conductor, different series and parallel combinations of cells may be accomplished in each module. Because this may be completed after the cells have been secured in the module housing, the module output can be altered without changing the physical arrangement of the cells.

It is desired that the temperature of each cell be monitored to evaluate performance of the array during operation. Because each cell is individually determinative of array performance it is not enough to measure gross or average temperatures of the array. Individual cell temperature excursions are monitored in the embodiment shown using Positive Temperature Coefficient (PTC) sensors placed in contact against the side of each cell. A PTC sensor is an electrical circuit element characterized by a dramatic increase in electrical resistance at an elevated temperature. A row of PTC devices are connected in series and laminated in a polymer carrier. The carrier is then mechanically biased toward a row of cells, the PTC spacing in the carrier being such that one device is pressed against each cell. The total resistance of the series is monitored as a signal of module cell temperatures. The PTC carrier extends between mounting posts 42 on recessed lands 43 near the ends of the housing as shown in FIG. 4c (the PTC and carrier are not shown in the figure). The carrier enters the housing through vertical slots 44 and extends the length of the inside of the housing over raised offset posts 45 (FIG. 6a). The offset posts 45 are located between the cell cradles (FIG. 4a) and have a height greater than the distance between the cells and housing side 16. In this manner, an interference exists between the cell side and the carrier and PTC devices. The details and geometry of the carrier and offset posts are shown in FIGS. 6a and b. When the cells are inserted, the carrier 50 flexes into a curved shape to accommodate the cell 2 while the tension of the carrier 50 maintains a biasing force on each PTC 52. In FIG. 6a the mounting posts 42 and offset posts 45 are isolated from the remaining structure for illustration purposes. FIG. 6b depicts the carrier 50 in section wrapped partially around a cell circumference. The carrier 50 thickness and the spacing of the PTC devices 52 from each cell 2 is exaggerated in the figure for clarity. Conductors are attached to each side of the PTC 52 and each leads to an adjacent PTC to form a series circuit of PTC devices. The conductors 53 and PTC devices 52 are laminated between two sides of the carrier 50. From each end PTC a terminal conductor extends outside the module for external connection. Preferably, a thermally conductive epoxy is used to attach the PTC to the cell to prevent movement due to vibration. PTC devices such as discussed here are known and commercially available. One such device is distributed under product number "S22 PTC" by the Raychem Circuit Protection Division of TYCO Electronics Corporation, Menlo Park, Calif., U.S.A. These particular PTC devices have a resistance of approximately one ohm at temperatures below 80° C. As the temperature of the device rises from 80 to 100° C. the device resistance increases to approximately 1000 ohms. A series circuit of such devices can be monitored to detect such a large increase in resistance as an indicator of one or more cells experiencing elevated temperatures above the 80 to 100° C. range. This temperature range is particularly suited for detecting events such as internal shorts in cells which will result in rapid cell failure. Although not prefered, other devices such as standard thermocouples may also be used for temperature monitoring.

FIG. 6c depicts an alternative method of applying similar PTC devices to cells in a module as presented here. The carrier 50 is woven above and below the top and bottom, respectively, of alternate cells—the PTCs being spaced farther apart on the carrier to provide the required increased total length. The PTCs are exaggerated to indicate their location on the cells. This configuration has been found to provide more intimate contact between the PTC 52 and the cells 2 resulting in more accurate temperature measurement. However, this configuration is more problematic during assembling of the modules, requiring more complex handling of the cells. This PTC configuration may be employed in the same module housing as discussed above.

Figure 7A:
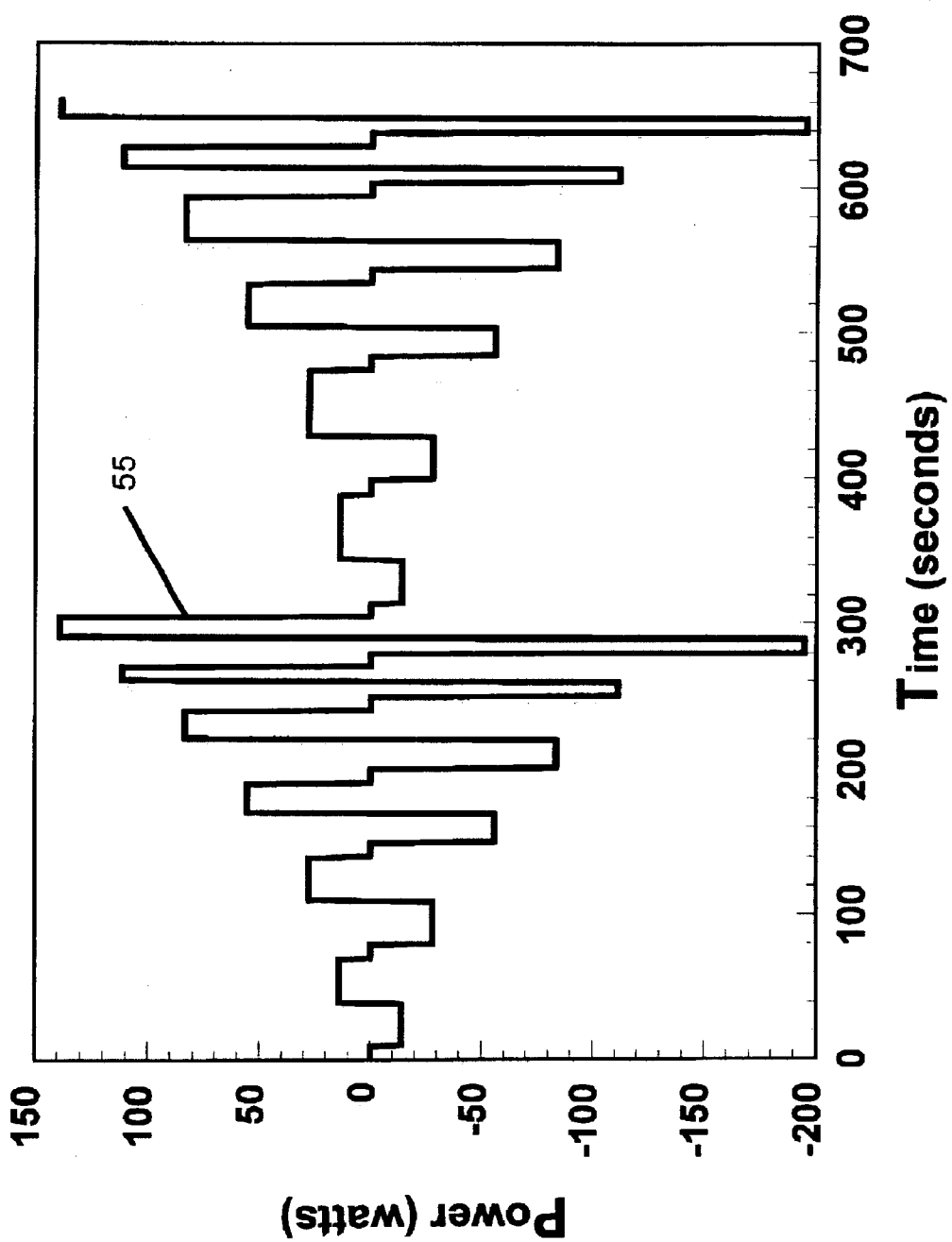
FIGS. 7a, b, and c are plots of a) a prototype power cycle, b) the resulting temperatures measured in cells of a single-pass module, and c) the resulting temperatures measured in cells of a three-pass module, having eight cells each.
Figure 7B:
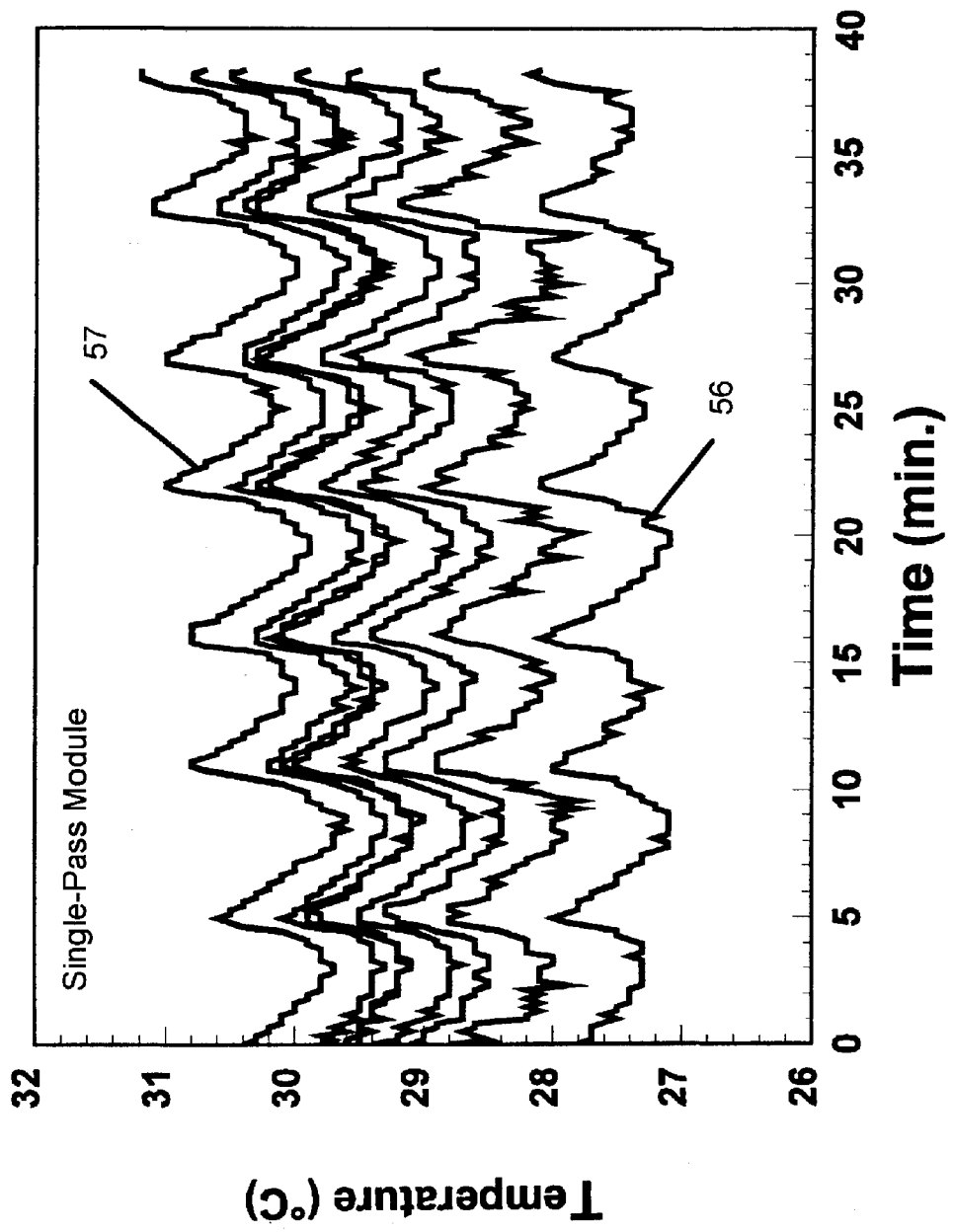
Figure 7C:
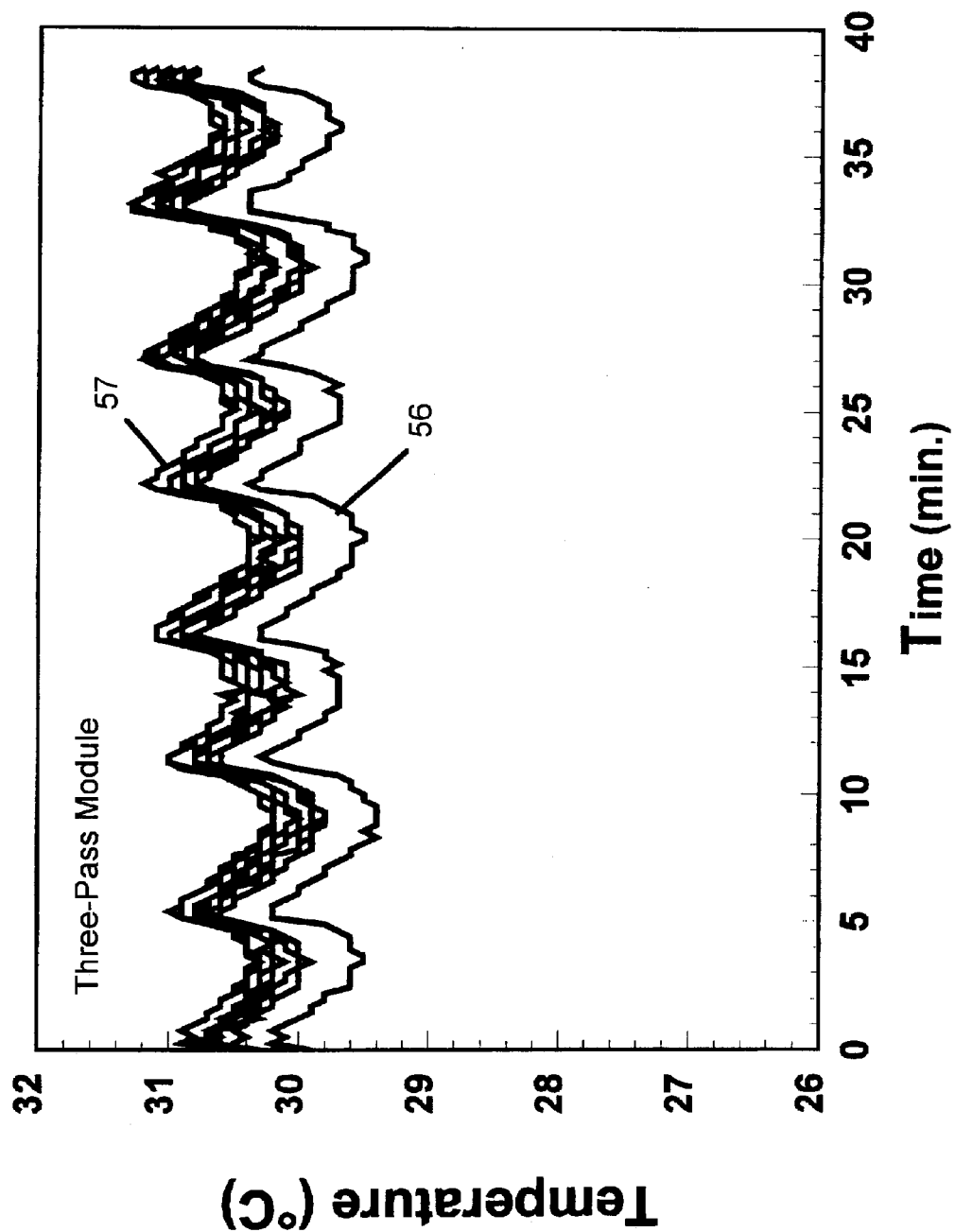

A prototype module having eight cells and configured as shown in FIGS. 4a, b, and c was built and tested. Each cell was a "sub-C" (Cs) configuration cell of nickel metal hydride chemistry. This cell has an average length of 1.65 inches (41.9 mm) and diameter of 0.861 inches (21.9 mm) and is based on the American National Standards Institute (ANSI) Battery Specification (C18.2M, Part 1-1999). To determine the efficacy of the three-pass design in dissipating cell heat energy, individual cell temperatures were determined for a selected charge and discharge history and a predetermined cooling air flow. For comparison, an identical array of cells was constructed and tested using a single pass of air flow through the cells. A housing identical to the three-pass module was constructed but with a single-pass passage around the cells. Both modules were operated through identical charge and discharge histories. The cell temperature response for the two configurations was then compared. FIG. 7a depicts a power cycle which has been defined for the above module as an element of an array battery for powering a hybrid-electric automobile. Charge and discharge (negative power) is shown as a function of arbitrary time. A charge and discharge pattern following this power cycle was applied to the prototype module and the single pass module. Each cell produced an average of about 0.4 watts of heat energy. A cooling air flow of 2 cubic feet per minute (CFM) was induced through the module housing in each case. Individual cell temperatures were monitored using thermocouples bonded to the cell sides. The response of each cell in the two modules is shown in FIGS. 7b and c. In each figure a plot line gives the temperature history of each cell in the respective module. In both figures, the lowest temperature plot line 56 is for the cell closest to the inlet. The highest temperature plot line 57 is for the cell closest to the outlet. The height of the envelope of all cell temperature plot lines is a measure of the temperature gradient in the cells of the configuration. In the single-pass module, the temperature difference from hottest to coolest cell is approximately 3 degrees, while in the three-pass module this is reduced to less than 1 degree. This reduced gradient in the three-pass module indicates the more uniform temperatures resulting from the three-pass cooling. The average temperature of the cells in the prototype three-pass module is slightly higher due to a higher ambient air temperature at the time of operation and test measurement.

In the above examples, each module includes a single linear array of cells. In alternative embodiments, each module may contain a two dimensional array of cells. For example, two rows of eight cells retained side-by-side in a single housing form a 16 cell module. The benefits of a multi-pass cooling would also be obtained in such a configuration. Other configurations are also contemplated. Larger unit modules potentially have increased spatial efficiency but are inherently less flexible with regard to forming larger arrays of varying size and capacity.

Figure 8:
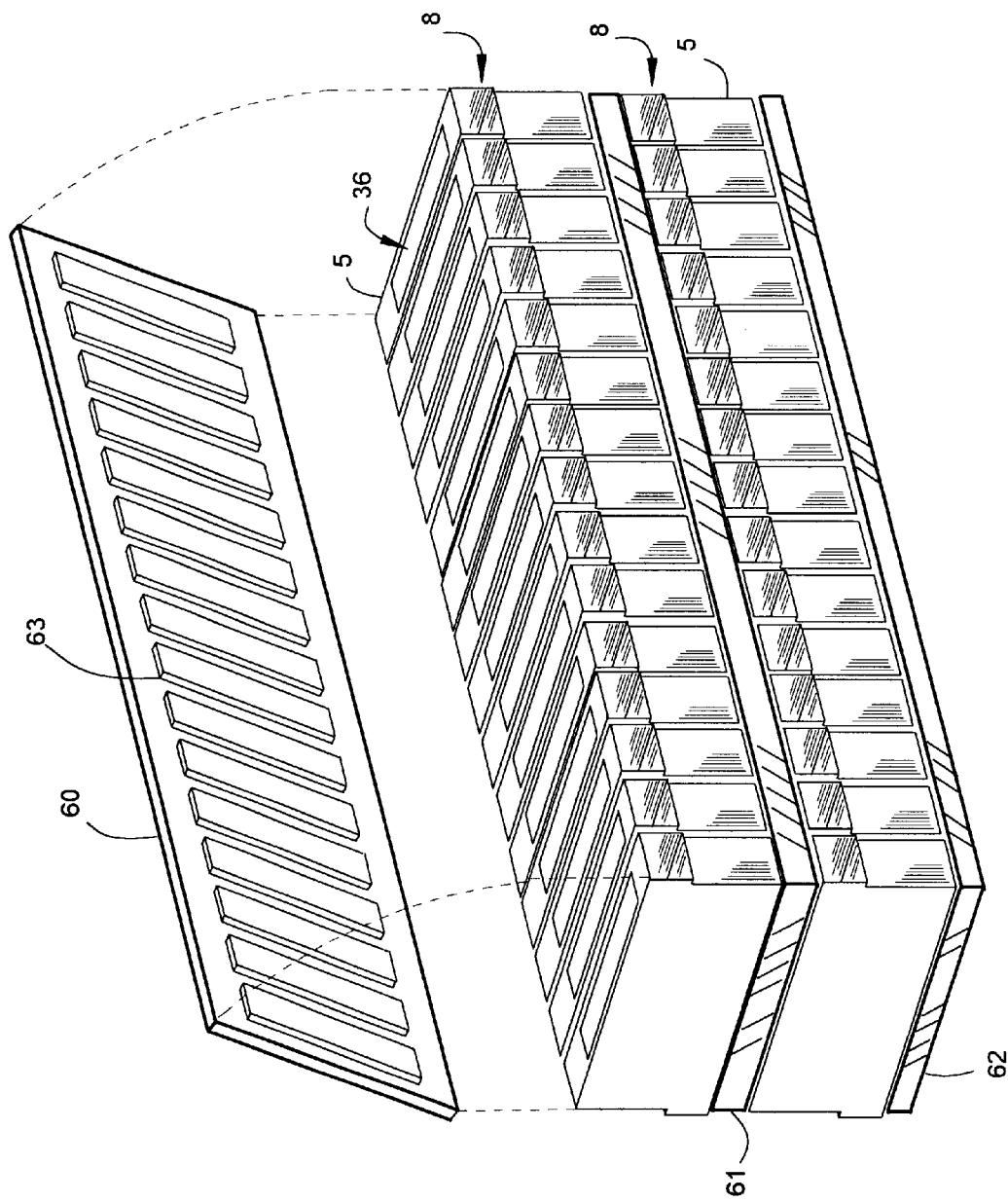
FIG. 8 depicts a cell array formed of two vertically stacked decks of cell modules.

FIG. 8 depicts a large cell array consisting of modules according to the embodiments of FIGS. 4a, b and c. The array consists of 30 modules 5, each containing eight nickel metal-hydride Cs cells (total of 240 cells) having an output of 1.2 volts each. The modules are arranged in two vertically stacked decks of modules. The modules of each deck are aligned closely side by side with their inlets and outlets, respectively, in single planes. Sets of three modules are connected electrically in series while in each module paired Cs cells are connected in parallel, and the pairs connected in series, following the schematic shown in FIG. 5. The total potential output of the Cs cell array is 144 volts with 10 independent voltage taps. An alternative configuration (not depicted) providing similar capacity is based on "D" nickel metal-hydride cells (ANSI Battery Specification C18.2M, Part 1-1999). This array consists of two vertically stacked decks of 10 modules each for a total of 20 modules. Each module contains six cells (a total of 120 cells). Sets of two modules are connected in series, the cells of each module also being connected in series with no cells in parallel. The twelve cells in each series set provide 14.4 volts, the 10 set of modules delivering a total of 144 volts with 10 independent voltage taps. The 240 Cs cell array and the 120 D cell array have comparable voltage outputs. The Cs array is slightly smaller physically. Previously, D cells have typically been used to form large arrays with the number of cells set by the voltage requirement of the application. The energy capacity of these arrays is set by the combined capacity of the D cells and, being at times more than necessary for the application, may not be optimum with respect to size and weight. It has been found that the paired Cs cells can be combined in a more optimum capacity having smaller total volume and less weight. Table 1 provides the comparable parameters of the two array designs.

TABLE 1

| Characteristic | 240 Cs Cell Array | 120 D Cell Array |
| --- | --- | --- |
| Output voltage | 144 | 144 |
| Capacity (amp/hours) | 4.4–5.2 | 6.0–7.5 |
| Volume ft$^3$ (modules only) | 0.393 | 0.411 |
| (m$^3$) | (0.0111) | (0.0116) |
| Weight lb. (kg) (cells only) | 28.8 (13.1) | 42.3 (19.2) |

The Cs cell array provides the same voltage output and somewhat less total capacity. However, its size and weight are significantly less than the D cell design. In applications where 144 volts are needed but the total capacity required is 5 ampere hours or less, a Cs based array is more efficient than the standard D cell configuration. A synergetic result of using the Cs cell in these arrays is the more efficient cooling that is obtained. The smaller Cs cells have a larger surface area per volume such that more effective cooling is obtained thereby enhancing life of the array. The overall effect of using Cs cells is a comparably sized array which is lighter and has reduced thermal gradients than the D cell based array. The Cs array could be expected to have a longer operational life before failure, presuming all other factors the same. In applications where a specific voltage requirement necessitates a certain minumum number of cells to develop a needed voltage, such as in the example above, a paired Cs cell based design will often provide a more optimum array. Cs cell arrays have been found particularly well suited to meet the demands of hybrid-electric vehicles.

Figure 9:
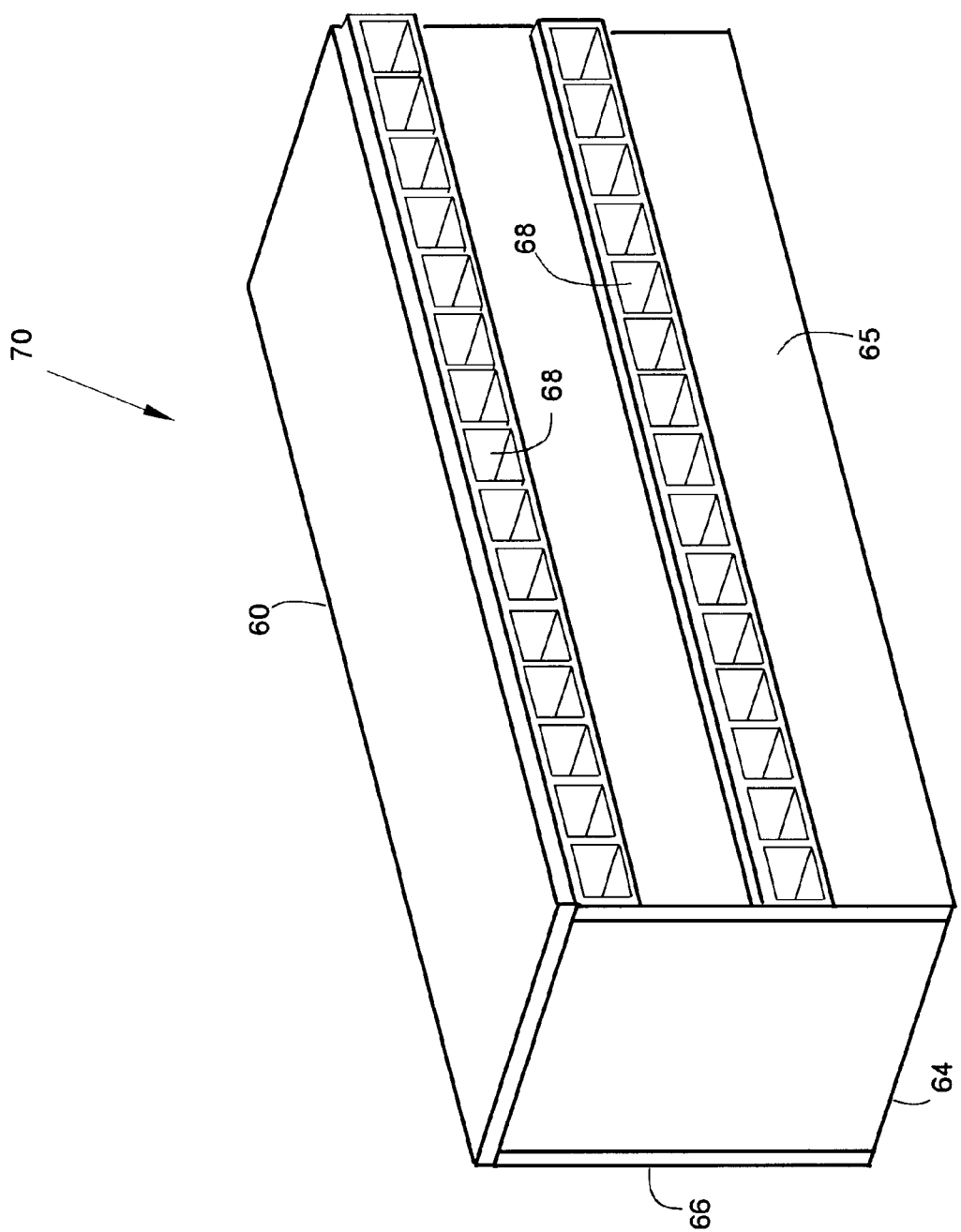
FIG. 9 depicts the cell array of FIG. 8 including a supporting outer frame.

FIG. 8 also depicts the manner in which individual modules are integrated by a coverplate 60, centerplate 61 and bottomplate 62 to form a rigid enclosing structure. The coverplate is rigid and planar and includes on its bottom face raised window inserts 63. Each of these window inserts 63 fits tightly within a module housing window 36 effectively sealing the top of the respective module housing. The center-to-center spacing of the inserts 63 is such that when the coverplate 60 is placed over the deck of modules 5 and the inserts 63 pushed into the module windows 36 the modules are fixed compactly in position. In the figure, the coverplate 60 has been lifted and rotated away from the array for viewing. The construction and fit of the centerplate 61 and bottomplate 62 is similar to that of the coverplate. The centerplate has window inserts (not shown) on its top and bottom face to fit respectively within the housing top window of the lower deck modules and the housing lower window of the top deck modules. The bottomplate 62 likewise has inserts (not shown) on its upper face located and sized to mate with the windows on the bottom of the lower deck modules. By combination with the coverplate 60, centerplate 61, and bottomplate 62 the modules are both sealed and fixed in relative position to form a more unified structure. Other rigid enclosure members are secured to the coverplate, centerplate and bottomplate, as shown in FIG. 9 to form a unified array battery 70. The coverplate 60 is positioned on the tops of the modules and, with the bottomplate, is secured to end covers 64, a faceplate 65 and a backplate 66 to complete a rigid enclosure surrounding, protecting and supporting the modules. The faceplate 65 and backplate 66 have transition ducts 68 which fit in an airtight manner with the module inlets and outlets, respectively. The transition ducts 68 and surrounding faceplate 65 provide structure for attaching external air supply plenums for directing air into the array battery. Because the module outlets are oriented on the opposite side of the array from the inlets, the configuration of the air supply and exhaust plenums will be relatively simple. If the modules were designed with the inlet and outlets on the same side of the module housings, the two plenums and associated ducting would, by necessity, be fit into a smaller space and may potentially interfere with each other. The design of the plenums and air supply elements will be obvious to one skilled in the art and is dependent upon the characteristics of the application. Both the compactness of the stacked modules and the simplicity of the common air supply plenums is due in part to the prismatic shape of the individual modules. The flat planar sides and tops and bottoms of the housings allow for a snug fit of adjacent modules. Both the PTC terminal conductors and the module power terminals pass through apertures in the faceplate 65 and backplate 66 and may be connected to bus bars (not shown) mounted to the plates. These bus bars then provide means of connection to external power and monitoring circuits. An additional advantage of arrays such as shown in FIG. 8 is the ease with which cells may be interchanged. In circumstances where a cell failure has been identified, individual modules may be tested and removed for replacement or repair. Both the configuration of the individual modules and the manner in which they are combined and retained in the array make interchange relatively simple. After disconnecting electrical terminals, a module may be simply lifted out of the opened array. Appropriate materials and methods of fabricating and joining the various structural elements of the array battery enclosure are available and well known to those skilled in the art. A nonconductive high density polymer plastic is a preferred material, but other materials are also contemplated.

Figure 10:
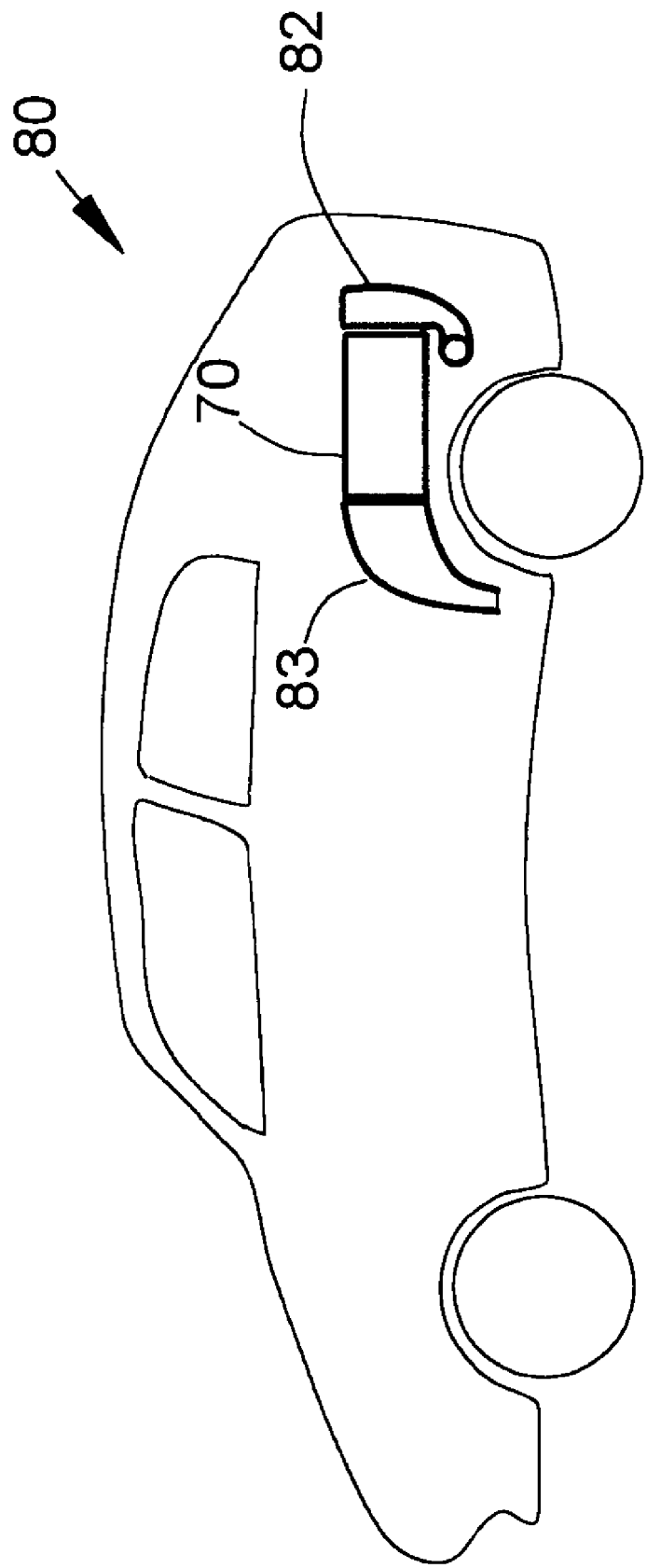
FIG. 10 depicts a vehicle powered by an array of cell modules according to the present invention.

By using an array battery such as described above in a powered device, the operational life of the device may be extended. In FIG. 10, such an array battery is integrated into a vehicle 80 for human transportation. In this example, the cooling air supply can be obtained from ambient air ducted through the vehicle body and exhausted in the same manner. A plenum 82 enclosing a supply fan is secured to the enclosure faceplate while an exhaust duct 83 directs waste air to the outside. The array battery output powers an electric motor connected to the drive wheels. Temperature monitoring systems may be integrated into the automobile system controls and driver interface. The above example modules and arrays have characteristics particularly suited to hybrid-electric vehicles in which electric motive power is used in series with a primary drive motor such as an internal combustion engine. However, the same concepts are applicable to modules and arrays for electric powered vehicles using other drive modes as well as other electric powered devices.

The present concepts for forming and operating cell arrays are not limited to a particular type of electrochemical cell. The advantages of multi-pass cooling, as demonstrated herein, are obtained with both primary and secondary cells; round and prismatic cells, and cell sizes other than those in the examples above. Although potentially suffering from larger thermal gradients than otherwise similar round and metallic housed cells, prismatic cells and cells having non-metallic housings will also benefit from the methods described herein. Examples of suitable cell types include, but are not limited to, lithium ion cells, including lithium ion polymer, lithium-sulfur cells, nickel metal hydride, lithium iron disulfide cells, nickel-cadmium, and lead-acid metal film cells. Some of these cells require additional safety features such as current and voltage monitoring circuits and thermal fuses. These elements may be incorporated into the modules described above by known methods. Alternatively, monitoring circuit elements may reside external to the array.

The preceding discussion is provided for example only. Other variations of the claimed inventive concepts will be obvious to those skilled in the art. For example, while air is primarily contemplated as the cooling medium, for its convenience and low cost, the novel concepts and advantages of the present invention extend to configurations using other cooling mediums. Adaptation or incorporation of known alternative devices and materials, present and future is also contemplated. The intended scope of the invention is defined by the following claims.

We claim:

1. An electrochemical cell module to efficiently cool cells and reduce cell temperature gradients during charging and discharging operations, comprising:
   a cell housing having an inlet and outlet;
   a plurality of interconnected electrochemical cells retained in the housing; and
   a passage having at least two passes for transmitting a cooling medium between the inlet and outlet and around all sides of each cell.

2. The electrochemical cell module of claim 1, wherein: the cells are retained in a side-to-side configuration.

3. The electrochemical cell module of claim 2, wherein: the passage has three passes.

4. The electrochemical cell module of claim 3, further comprising:
   a temperature monitoring device secured to each cell and capable of providing a signal at a predetermined temperature.

5. The electrochemical cell module of claim 4, wherein: each cell of the plurality of cells is a sub-C configuration cell.

6. The electrochemical cell module of claim 1, wherein: the passage has a first separated portion and a second separated portion;
   each cell has a top end and a bottom end, each top end adjacent the first separated portion,
      and each bottom end adjacent the second separated portion; and
   further comprising: at least one first conductor and at least one second conductor, the at least one first conductor residing substantially within the first separated portion and connected to at least one cell top end, and the at least one second conductor residing substantially within the second separated portion and connected to at least one cell bottom end;
   such that a portion of a cooling medium flow passing through the passage passes through the separated portions and cools the conductors.

7. The electrochemical cell module of claim 2, wherein: the housing is generally prismatic.

8. The electrochemical cell module of claim 6, wherein: the passage has a gradually reducing cross-section between the inlet to the outlet.

9. An electrochemical cell module to efficiently cool cells and reduce cell temperature gradients during charging and discharging operations, comprising:
   a prismatic cell housing having an inlet and outlet;
   means of retaining a plurality of interconnected cells in the housing in a side-to-side configuration; and
   means of directing a cooling medium between the inlet and outlet and around all sides of each cell in at least two passes.

10. An extended life electrochemical cell array comprising:
    a first deck of modules comprising at least two modules retained together, each module comprising:
       a cell housing having an inlet and outlet;
       a plurality of interconnected cells retained in the housing,
       a passage having at least two passes for transmitting a cooling medium between the inlet and outlet and around all sides of each cell.

11. The cell array of claim 10, wherein:
    each housing has two opposing sides, each side having a window opening;
    and the array further comprising:
       a first plate and a second plate; the first plate and second plate each having a face with raised portions, the raised portions each sized and configured to fit sealingly within a window opening;
    the housings captured between the first plate and second plate, each housing window opening being closed by a raised portion.

12. The cell array of claim 10, wherein: the cells are retained in a side-to-side configuration.

13. The cell array of claim 12, wherein: each cell has a connected temperature monitoring device, the temperature monitoring devices being interconnected in a temperature monitoring circuit.

14. The cell array of claim 11, wherein:
    the first plate has a second opposite face with raised portions each sized and configured to fit sealingly within a window opening, and
    further comprising:
       a third plate having a face with raised portions each sized and configured to fit sealingly within a window opening;
       a second deck of modules like the first; the housings of the second deck of modules captured between the first plate and third plate, each housing window opening being closed by a raised portion.

15. A method of operating large electrochemical cell array for extended life comprising:
    retaining a plurality of cells in interconnected side-to-side configurations in a plurality of prismatic housings;
    stacking the housings to form an array;
    interconnecting the housings to produce a predetermined output;
    directing a cooling medium through each housing such that the cooling medium flows over all sides of each cell more than once; and
    monitoring each cell for elevated temperature condition.

16. The method of claim 15, wherein: air is directed through the housings.

17. An electrically powered device incorporating a cell array with reduced thermal gradients and having an extended useful life, comprising:
    a powered body;
    an electrochemical cell array according to claim 11 retained in the powered body and functionally connected to the powered body.

18. The device of claim 17, wherein: the powered body is a vehicle.

* * * * *